US008449795B2

(12) United States Patent
Yang et al.

(10) Patent No.: US 8,449,795 B2
(45) Date of Patent: May 28, 2013

(54) METHOD OF MANUFACTURING SINTER-ACTIVE $U_3O_8$ POWDER AND METHOD OF PRODUCING NUCLEAR FUEL PELLETS UTILIZING THE SAME

(75) Inventors: Jae Ho Yang, Yuseong-gu (KR); Young Woo Rhee, Yuseong-gu (KR); Ki Won Kang, Yuseong-gu (KR); Jong Hun Kim, Yuseong-gu (KR); Keon Sik Kim, Yuseong-gu (KR); Kun Woo Song, Yuseong-gu (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 275 days.

(21) Appl. No.: 11/947,502

(22) Filed: Nov. 29, 2007

(65) Prior Publication Data
US 2008/0185743 A1 Aug. 7, 2008

(30) Foreign Application Priority Data
Dec. 5, 2006 (KR) .................. 10-2006-122535

(51) Int. Cl.
*G21C 21/00* (2006.01)
*C01G 43/01* (2006.01)
*C01G 43/025* (2006.01)

(52) U.S. Cl.
USPC ................ 264/0.5; 423/260; 423/261

(58) Field of Classification Search
USPC ............................................ 264/0.5
See application file for complete search history.

(56) References Cited

U.S. PATENT DOCUMENTS 3,094,377 A * 6/1963 Langrod ................. 423/261
3,930,787 A * 1/1976 DeHollander et al. ....... 432/198
(Continued)

FOREIGN PATENT DOCUMENTS
EP 395979 A1 * 11/1990
JP 58-124998 7/1983
(Continued)

OTHER PUBLICATIONS

R.J. McEachern, et al, "A Review of the Oxidation of Uranium Dioxide at Temperatures Below 400°C," Journal of Nuclear Materials, 1998, pp. 87-121, 254.
(Continued)

*Primary Examiner* — Joseph S Del Sole
*Assistant Examiner* — Erin Snelting
(74) *Attorney, Agent, or Firm* — McDermott Will & Emery LLP

(57) ABSTRACT

There is provided a method of producing $U_3O_8$ powder having large surface area and small particle size by oxidizing defective $UO_2$ pellets and manufacturing nuclear fuel pellets which are stable in a pore structure and high in density through the use of a mixture comprising $UO_2$ powder and $U_3O_8$ powder. The method includes producing an U308 powder having a surface area of at least 1 $m^2/g$ by oxidizing defective $UO_2$ pellets at a temperature of 300 to 370° C. in such a way that a maximum weight increase rate per 1 g of the $UO_2$ pellets is up to 0.06 wt %/min; producing a mixed powder by mixing the $U_3O_8$ powder with an $UO_2$ powder by 2 to 15 wt %; producing a compact by compression molding the mixed powder; and sintering the compact in a reducing gas atmosphere at a temperature of 1600 to 1800° C. In addition, a small amount of an Al-compound may be added to the oxidized $U_3O_8$ powder before the $U_3O_8$ powder is mixed with the $UO_2$ powder. The additive such as Al is mixed with the $U_3O_8$ powder and then mixed with the $UO_2$ powder to produce the pellets by a conventional production method. This ensures a stable pore structure, high density and a considerable increase in a crystal grain size.

8 Claims, 10 Drawing Sheets

U.S. PATENT DOCUMENTS

| | | | |
|---|---|---|---|
| 4,389,355 A * | 6/1983 | Thornton et al. | 264/0.5 |
| 4,666,691 A | 5/1987 | Hasegawa | |
| 4,889,663 A | 12/1989 | Michel | |
| 5,882,552 A * | 3/1999 | Song et al. | 264/5 |
| 6,235,223 B1 * | 5/2001 | Doerr et al. | 264/0.5 |
| 6,251,309 B1 * | 6/2001 | Song et al. | 252/643 |
| 6,251,310 B1 * | 6/2001 | Song et al. | 264/0.5 |

FOREIGN PATENT DOCUMENTS

| | | |
|---|---|---|
| JP | 60-98388 | 6/1985 |
| JP | 01248092 A * | 10/1989 |
| JP | 11-23764 | 1/1999 |
| JP | 2000314790 | 11/2000 |
| JP | 2000314791 | 11/2000 |
| KR | 1020020085280 A | 11/2002 |

OTHER PUBLICATIONS

Office Action dated Dec. 14, 2010, issued in Japanese Patent Application No. 2007-311935.

* cited by examiner

METHOD OF MANUFACTURING SINTER-ACTIVE $U_3O_8$ POWDER AND METHOD OF PRODUCING NUCLEAR FUEL PELLETS UTILIZING THE SAME

CROSS-REFERENCE TO RELATED APPLICATIONS

This application claims the priority of Korean Patent Application No. 2006-122535 filed on Dec. 5, 2006, in the Korean Intellectual Property Office, the disclosure of which is incorporated herein by reference.

BACKGROUND OF THE INVENTION

1. Field of the Invention

The present invention relates to a method of producing nuclear fuel pellets. Particularly, this invention relates to a method of producing $U_3O_8$ powder having large surface area and small particle size by oxidizing defective $UO_2$ pellets, and manufacturing nuclear fuel pellets which are stable in a pore structure and high in density through the use of a mixture comprising $UO_2$ powder and $U_3O_8$ powder. Description of the Related Art Nuclear powder utilizes heat generated by nuclear fission. An industrially applicable nuclear fuel material includes cylindrical or circular pellets produced by molding and sintering an oxide such as uranium (U), plutonium (Pu) and thorium (Th) alone or by combination.

The nuclear fuel material currently in widest use is uranium oxide pellets. In a typical production process of the uranium oxide pellets, a lubricant is added to and mixed with a starting material of uranium oxide powder, and then pre-molded under a predetermined pressure, e.g., about 1 ton/cm$^2$ to produce a slug. The slug is pulverized to obtain granules. Subsequently the lubricant is added to and mixed with the granules obtained and then compression-molded to form a compact, i.e., green pellets having a theoretical density (TD) of about 50%. The compact is sintered in a hydrogen-containing gas atmosphere to produce uranium oxide pellets. The uranium oxide pellets obtained as described above have a TD of about 95.5% and a grain size of 6 to 10 μm. Crystal grains of the nuclear fuel pellets are of an equiaxed polyhedron.

A general process of producing the nuclear fuel pellets typically entails a certain amount of defective loss. For example, surfaces of the nuclear fuel pellets produced by sintering are ground to suit dimensions of a drawing of a technical specification, bringing about grinding-induced byproducts. Also, during the pellet production process, any defects of the pellets may lead to defective products failing to satisfy the drawing of the technical specification. A defective loss such as defective $UO_2$ pellets or grinding sludgy generated during sintering is oxidized in the air at a temperature of 400 to 600° C. and converted into $U_3O_8$ powder. Then the $U_3O_8$ powder is mixed with the $UO_2$ powder to be recycled. The mixture of $UO_2$ and $U_3O_8$ powder is pressed and sintered to produce $UO_2$ pellets in the same way as the single $UO_2$ powder.

The $U_3O_8$ powder obtained by oxidizing the defective pellets is much less sinterable than the $UO_2$ powder. Therefore, the nuclear fuel pellets containing the $U_3O_8$ powder recycled from defective powder or defective pellets is lower in density, smaller in a crystal grain size and more unstable in a pore structure than pellets produced from pure $UO_2$ powder.

In a conventional case where the pellets are prepared from powder mixture of $UO_2$ and recycled $U_3O_8$ powder obtained by oxidizing the defective pellets at a temperature of 400 to 600° C., the density of pellets are decreased in TD by about 1 to 1.5% and in a grain size by about 1 to 2 μm per 10 wt% of the $U_3O_8$ powder added. The content of recycled $U_3O_8$ powder in the mixture is limited within 15% by weight of the mixture of $UO_2$ and $U_3O_8$ powder. Therefore, the production process of the recycled $U_3O_8$ powder needs to be regulated to improve the sinterability of $U_3O_8$ powder, thereby enhancing characteristics of the nuclear fuel pellets.

U.S. Pat. No. 4,889,663 discloses a method of producing pellets using $U_3O_8$ powder obtained from $UO_2$ powder. In this document, the $UO_2$ powder is oxidized to obtain the $U_3O_8$ powder and then added to the $UO_2$ powder to be molded and sintered. The $U_3O_8$ powder oxidized from the $UO_2$ powder is added to the $UO_2$ powder produced by a dry process, thereby increasing strength of a compact and thus reducing end-capping.

Yet, the pellet production method as described above is accompanied with problems due to very big ring-shaped pores formed inside the pellets. The ring-shaped pores, if present, roughen surfaces of the pellets and increases volume of open pores of the pellets, which, among the pores, are connected to the surfaces of the pellets. Increase in volume of the open pores in the pellets allows moisture from the air to be more adsorbed through the open pores while the pellets are handled or stored. Moreover, the open pores serve as a passage for releasing nuclear fission gas outside the pellets. Therefore, a greater volume of the open pores degrades quality of the nuclear fuel pellets.

In a case where the $U_3O_8$ powder obtained by oxidizing the pellets or scrap powders is used to prepare the pellets, many defects arise due to difference between the $U_3O_8$ powder and the $UO_2$ powder in characteristics. Japanese Patent Laid-open Publication No. 2000-314790 and Korean Patent No. 0424331 disclose improved technologies, in which post-oxidized $U_3O_8$ powder is pulverized up to a certain size and recycled. Mechanical pulverizing undermines economic efficiency due to a post-oxidization follow-up process and causes particulate-induced environmental pollution. Japanese Patent Laid-open Publication No. 2000-314791 discloses a process of repeatedly oxidizing and reducing oxidized powder up to a certain size. However, this technology is burdensome to the process and low in economic efficiency.

SUMMARY OF THE INVENTION

An aspect of the present invention provides a method of producing $U_3O_8$ powder having large surface area and small particle size by oxidizing defective $UO_2$ pellets, and manufacturing nuclear fuel pellets which are stable in a pore structure and high in density through the use of a mixture comprising $UO_2$ powder and $U_3O_8$ powder.

According to an aspect of the present invention, there is provided a method of producing nuclear fuel pellets, the method including: producing an $U_3O_8$ powder having a surface area of at least 1 m$^2$/g by oxidizing defective $UO_2$ pellets at a temperature of 300 to 370° C. in such a way that a maximum weight increase rate per 1 g of the $UO_2$ pellets is up to 0.06 wt%/min; producing a mixed powder by mixing the $U_3O_8$ powder into an $UO_2$ powder by 2 to 15 wt%; producing a green compact by compression molding the mixed powder; and sintering the green compact in a reducing gas atmosphere at a temperature of 1600 to 1800° C.

The defective $UO_2$ pellets may have a weight of 100 mg or more and a density of 8.8 g/cm$^3$ or higher.

The reducing gas may be hydrogen. The reducing gas may be at least one selected from a group consisting of carbon dioxide, a water vapor and an inactive air.

The method may further include mixing an additive with the $U_3O_8$ powder, between the producing an $U_3O_8$ powder and the producing a mixed powder. The additive may include one of an organic compound, an inorganic compound, and mixtures thereof, the organic and inorganic compounds comprising one selected from a group consisting of Al, Cr, Ti, Fe, Nb and mixtures thereof.

The additive may be an Al-compound, wherein the Al-compound may be mixed with the $U_3O_8$ powder in such a way that Al/U in the $UO_2+U_3O_8$ mixed powder is 1 to 50 µg/g. The Al-compound may be at least one selected from Al-oxide, Al-nitride, Al-stearate, Al-chloride, and Al-hydroxide.

According to the present invention, conditions for oxidizing the defective nuclear fuel pellets are regulated to control characteristics of oxidized powder. Then the oxidized powder is recycled in the nuclear fuel sintering process, thereby ensuring the nuclear fuel pellets with a stable pore structure and high density.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
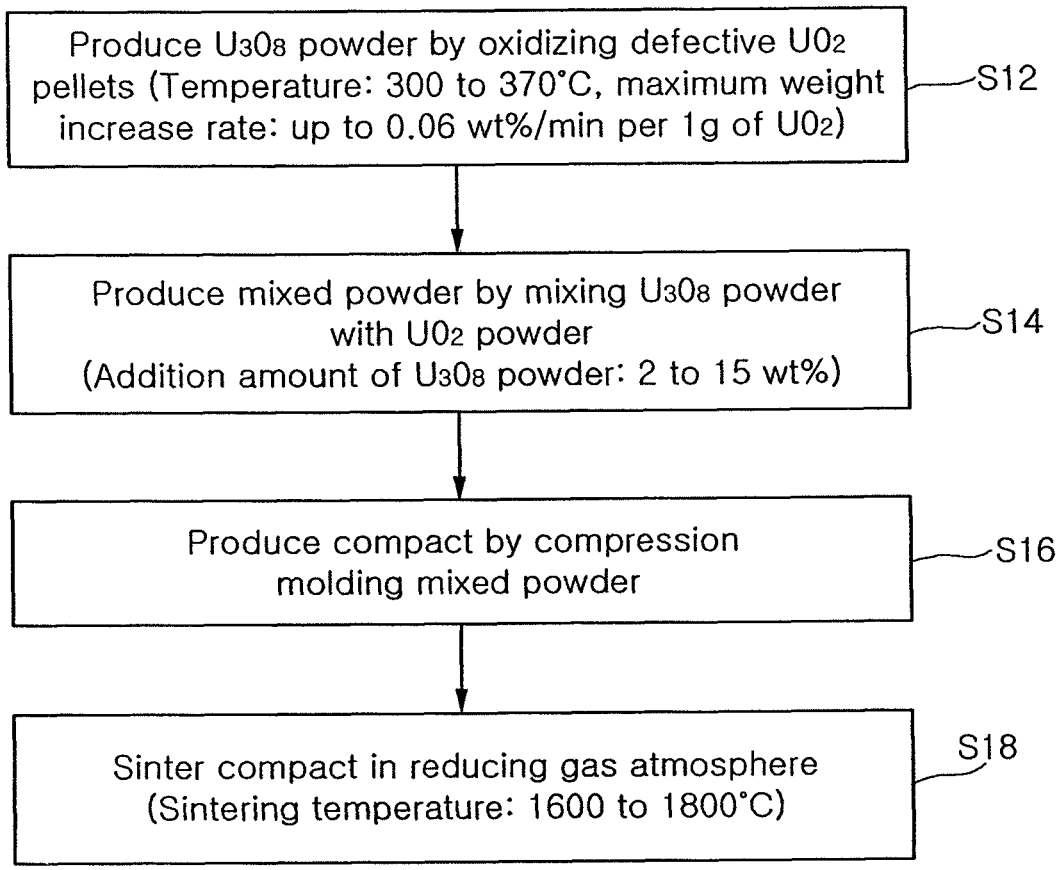
FIG. 1 is a procedural view for explaining a method of producing nuclear fuel pellets according to an exemplary embodiment of the invention.

FIG. 1 is a procedural view illustrating a method of producing nuclear fuel pellets according to an exemplary embodiment of the invention.

As shown in FIG. 1, in a first operation S 12 to produce the nuclear fuel pellets according to the present embodiment, defective $UO_2$ pellets are oxidized to prepare $U_3O_8$ powder. The oxidization process is carried out at a temperature of 300 to 370° C. in such a way that a maximum weight increase rate per 1 g of $UO_2$ pellets is up to 0.06 wt%/min. The oxidization temperature and oxidization rate according to the present embodiment are controlled in oxidizing the defective $UO_2$ pellets thereby to produce the $U_3O_8$ powder having a large surface area and small grain size.

The defective $UO_2$ pellets used in this operation includes defective pellets and scraps thereof, and may have a density of 80% or higher with respect to theoretical density. These defective $UO_2$ pellets may have a weight of at least 100 mg and a density of at least 8.8 g/cm3.

$UO_2$, when oxidized into $U_3O_8$ phase in an oxidizing atmosphere, is expanded in volume due to big differences in density between two phases. That is, $UO_2$=10.96 g/cm$^3$, and $U_3O_8$=8.3 g/cm$^3$. Since the pellets have grains combined together, the grains are pulverized and powdered under stress caused by oxidization-induced deformation. Therefore, the pellets may be relatively easily powdered and recycled through oxidizing thermal treatment.

As described above, an oxidization rate of the $UO_2$ pellets into the $U_3O_8$ powder mainly relies on temperature. That is, the oxidization rate is slow at a low and high temperature and fastest at a middle temperature. The oxidization rate is abnormally slowed down at a high temperature since the $UO_2$ pellets accommodate deformation during oxidization and do not change into the $U_3O_8$ powder.

In a conventional recycling process of defective $UO_2$ pellets or scraps, an oxidization temperature is set between 400 and 500° C., which enables a high oxidization rate, to enhance productivity. The conventionally oxidized $U_3O_8$ powder is poorly sinterable because it has relatively small surface area and large particle size. When conventionally oxidized $U_3O_8$ powder is mixed with the $UO_2$ powder to produce the pellets, the mixed powder is reduced in sinterability. On the contrary, it has been found that the $U_3O_8$ powder having a large surface area and small particle is obtainable by controlling the oxidization conditions in such a way that the oxidization temperature ranges 300 to 370° C. and a maximum weight increase rate 1 g of $UO_2$ pellets is up to 0.06 wt%/min. Also, the $U_3O_8$ powder so obtained, when mixed with the $UO_2$ powder to produce the pellets, assures the pellets with a stable pore structure and high density (refer to examples which will be described later).

Next, in operation S14, a mixed powder is produced by mixing the $U_3O_8$ powder obtained by the oxidization with the $UO_2$ powder by 2 to 15 wt %. This mixing process may be carried out by one of a tumbling mixer and a Nauta mixer used in a general production process of the nuclear fuel pellets.

Alternatively, prior to the mixing process, an additive such as Al may be mixed in a small amount with the $U_3O_8$ powder obtained by the oxidization to produce an additive-mixed powder. In producing the nuclear fuel pellets, various additive elements may be employed to improve pellet characteristics such as higher density and larger grain size of the pellets. The additive elements with such characteristics may include Al, Cr, Ti, Fe, Nb and mixtures thereof. Also, the additive may be organic and inorganic compounds containing the additive elements as just described. The additive is mixed in several ppm to thousands of ppm by a weight ratio with respect to positive ions of uranium of the pellets. An addition amount of the additive varies with the type thereof.

A representative additive may be an Al-compound. Here, the Al-compound is mixed with the $U_3O_8$ in such a way that Al/U in the $UO_2+U_3O_8$ mixed powder is 1 to 50 µg/g. The Al-compound may be one selected from a group consisting of Al-oxide, Al-nitride, Al-stearate, Al-chloride, and Al-hydroxide.

In general, the additive, when dry-mixed in a small amount, is mixed using a certain amount of medium powder and then added to/mixed with a parent powder thereby to increase mixing properties. For the $UO_2$ nuclear fuel, the medium powder may employ the $UO_2$ powder identical to the parent powder and the defective pellet oxidized $U_3O_8$ powder. The production process of the nuclear fuel entails a certain amount of the defective pellets, which thus need to be recycled. Therefore, it is desirable to add the additive, with the defective pellet oxidized $U_3O_8$ powder as the medium powder, thereby enhancing mixing properties. The superior mixing properties apparently result from the defective pellet oxidized $U_3O_8$ powder having the unique feature of minute cracks, and the excellent fluidity thereof. The minute cracks of the defective pellet oxidized $U_3O_8$ powder serve to adsorb the additive, thus advantageous for uniformly dispersing the additive. Also, the defective pellet oxidized $U_3O_8$ powder is much more fluid than the $UO_2$ powder, and thus spread uniformly and mixed intimately due to such fluidity when mixed with the $UO_2$ powder.

However, the defective pellet oxide $U_3O_8$ powder prepared by a general oxidization process forms a group of big pores shaped as clusters of grapes during sintering. The big pores prevent densification and grain growth of the nuclear fuel pellets, thereby inhibiting grain growth induced by the additive. Particularly, when the big pores are clustered in the shape of grapes, the grain growth brought about by the additive will be more inhibited. Therefore, in a case where the $U_3O_8$ powder is used as a medium for mixing the additive, it is of great importance to prevent a pore structure from deteriorating due to the $U_3O_8$ powder.

The nuclear fuel pellets, when produced using the $U_3O_8$ powder obtained through the process of the present embodiment, is not so big in size of pores as to inhibit grain growth inside the nuclear fuel pellets, but uniform in a pore structure, free from clusters of grapes. Therefore, the $U_3O_8$ powder of the present embodiment enhances mixing properties of the additive added in a small amount and improves the pore structure, thereby maximizing grain growth effects from the additive.

Thereafter, in operation S16, the mixed powder is compression-molded to form a green compact, and in operation S18, the green compact is sintered in a reducing gas atmosphere at a temperature of 1600 to 1800° C. to produce desired nuclear fuel pellets.

For example, the previously obtained mixed powder is injected into a molding die and pressed under a pressure of 3 to 5 ton/cm² to produce a desired cylindrical green compact. Subsequently, the green compact is sintered in a reducing gas atmosphere for 1 to 12 hours at a temperature of 1600 to 1800° C. The reducing gas may adopt a hydrogen gas mixed with at least one selected from a group consisting of hydrogen, dioxide, carbon monoxide, a water vapor and nitrogen and an inactive air.

Figure 2:
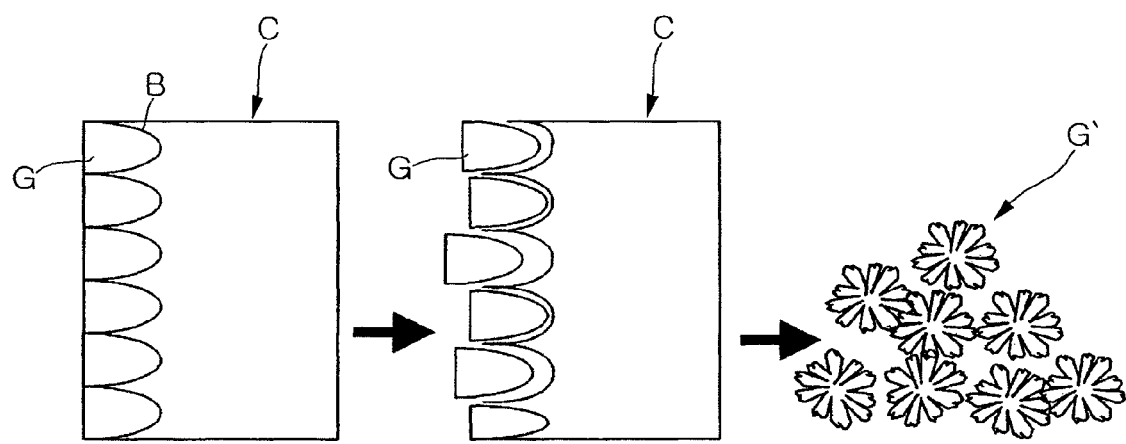
FIG. 2 is a schematic view illustrating oxidization of $UO_2$ pellets in a conventional oxidizing process.

FIG. 2 is a schematic view illustrating oxidization of $UO_2$ pellets in a conventional production process.

As shown in FIG. 2, in a temperature range falling out of the range of the present embodiment, oxygen is diffused with a higher rate at boundaries B of $UO_2$ crystal grains G. Therefore, most oxygen is diffused into the pellets C through the boundaries B of the crystal grains. Accordingly, a large-volume $U_3O_8$ phase may be precipitated from the boundaries B of the crystal grains which are located inward and relatively distant from surfaces of the pellets C. In this case, the boundaries B of the crystal grains are destroyed due to increase in volume thereof and inner surface portions distant from the surfaces of the pellets C are exposed to the air again. The oxygen is diffused and oxidized again along the exposed boundaries of the crystal grain, experiencing synergic effects. Oxidization occurs relatively fast by such synergic effects.

Figure 3:
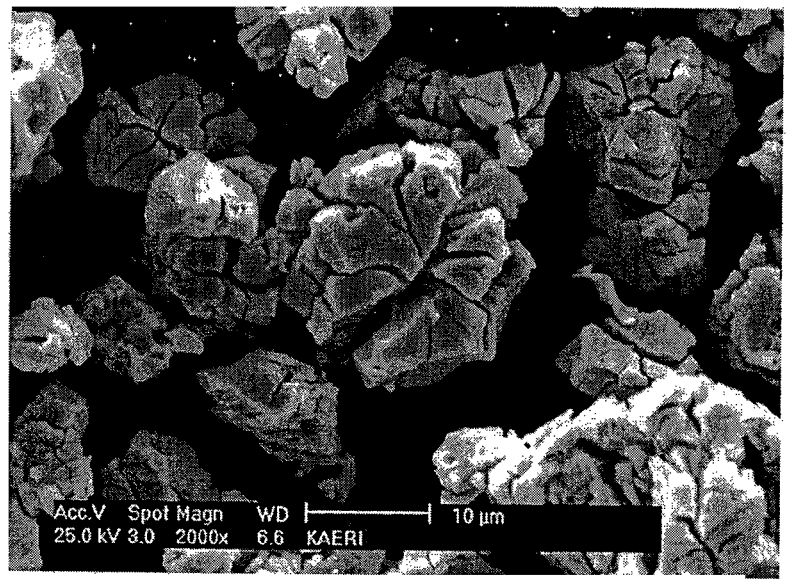
FIG. 3 is a scanning electron microscope picture illustrating $U_3O_8$ powder oxidized at a temperature of 450° C.

FIG. 3 is a scanning electron microscope picture illustrating $U_3O_8$ powder oxidized at a temperature of 450° C., which is a general oxidization condition. As shown in FIG. 3, the $U_3O_8$ powder has a low surface area of 0.5 m²/g and a big grain size. The oxidized $U_3O_8$ powder is separated into crystal grains by undergoing the process as shown in FIG. 2 and the round-shaped crystal grains G are oxidized into pop-corn shaped crystal grains G'.

In contrast, in an oxidization method of the present embodiment, the $U_3O_8$ powder is oxidized at a temperature of 300 to 370° C., lower than a general oxidization temperature to slow down the oxidization rate. Here, a maximum weight increase per 1 g of the $UO_2$ pellets is up to 0.06 wt%/min. This oxidization method may degrade productivity slightly, but increases a surface area of the $U_3O_8$ powder and ensures fine particle grain size thereof, thereby improving the pellet characteristics when the $U_3O_8$ powder is mixed with the $UO_2$ powder. This will be described in further detail hereinafter.

Figure 4:
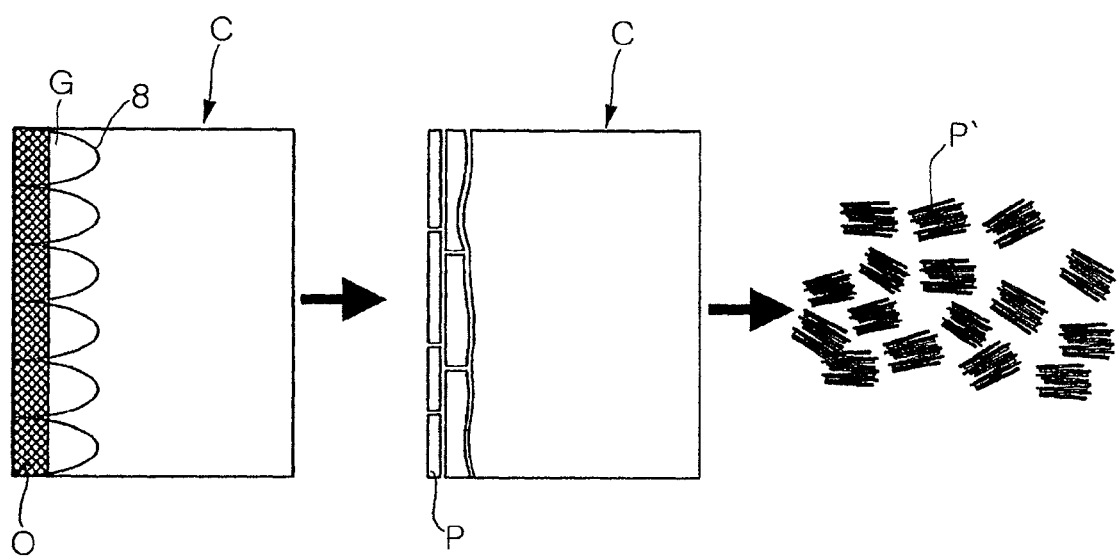
FIG. 4 is a schematic view illustrating oxidization of $UO_2$ pellets according to the invention.

FIG. 4 is a schematic view illustrating oxidization of an $UO_2$ pellets according to a production method of nuclear pellets according to the present embodiment.

As shown in FIG. 4, in a case where an oxidization rate is controlled at a temperature of the present embodiment, the oxygen is diffused at a low rate both through boundaries B of crystal grains and through inner portions of the crystal grains G. That is, there is less difference in the oxidization rate. Accordingly, the oxygen is adsorbed and diffused into the pellets C from surfaces thereof, in a sufficient time. Therefore, the oxygen layer 0 may grow inward from the surfaces of the pellets C in a certain thickness. Moreover, the oxidization layer 0 is less dense in oxygen from the surfaces to inner peripheries of the pellets. This assures sufficient time for forming an intermediate oxide layer differing little in volume from the $UO_2$ phase. This as a result prevents cracks in grain boundary caused by a deformation force so that the $UO_2$ crystal grains are maintained in shape without being powdered. Furthermore, the powder P' is sized very small due to the greatly small size of the crystal grains P of the intermediary oxide phase.

Figure 5:
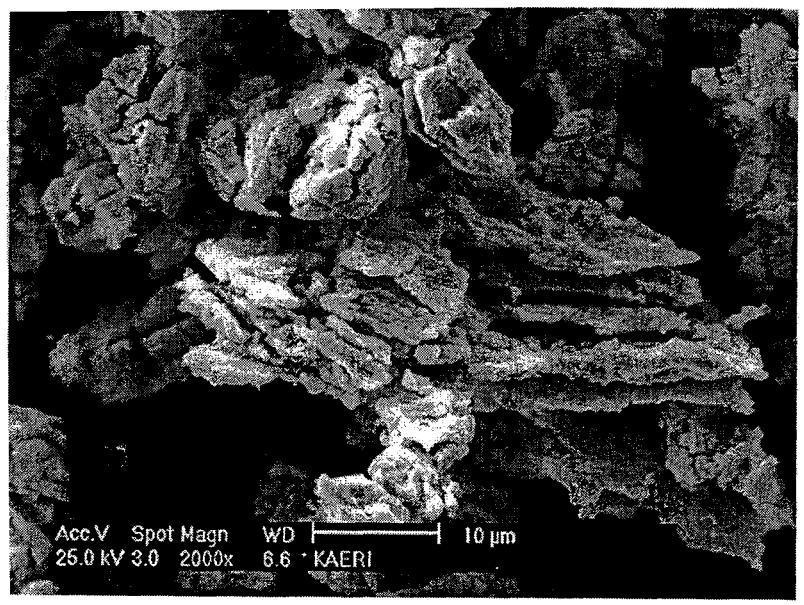
FIG. 5 is a scanning electron microscope picture illustrating $U_3O_8$ powder oxidized at a temperature of 325° C. according to an exemplary embodiment of the invention.

FIG. 5 is a scanning electron microscope picture illustrating $U_3O_8$ powder oxidized at a temperature of 325° C. according to a production method of nuclear pellets according to an exemplary embodiment of the invention.

As shown in FIG. 5, plate-shaped powders with a certain thickness and a small grain size are observed considerably. The powders obtained have a surface area of 1.5 m²/g, a considerable increase compared with the powders oxidized at a temperature of 450° C. as shown in FIG. 3.

Figure 6:
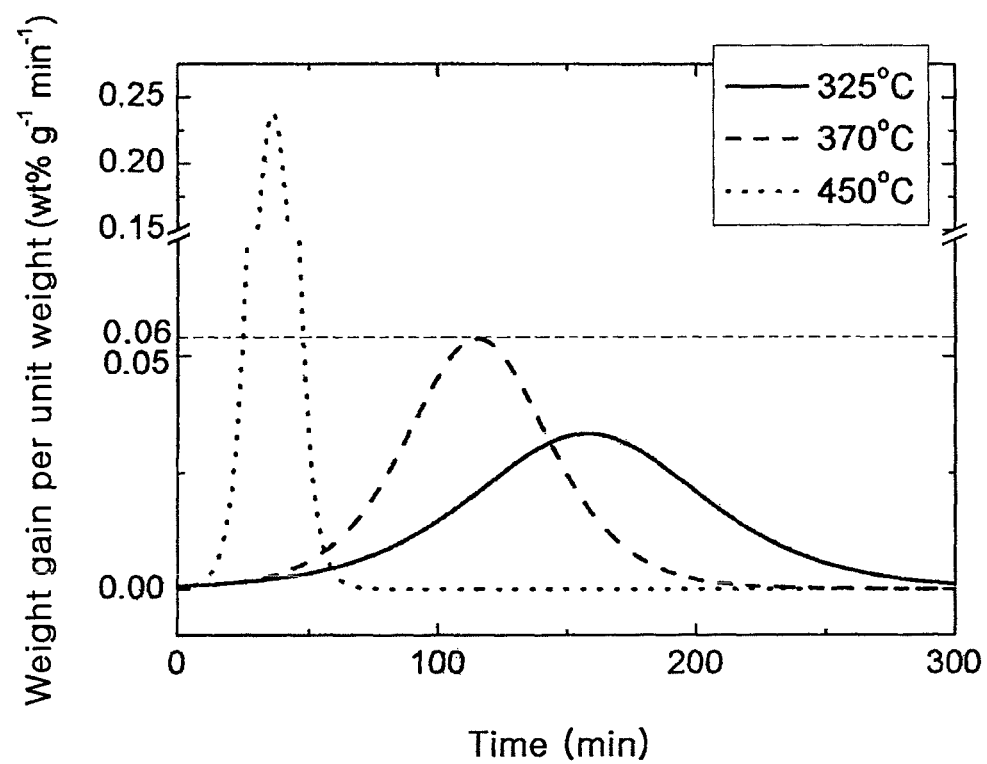
FIG. 6 is a graph illustrating a change in an oxidization rate of $UO_2$ pellets according to an oxidization temperature.

FIG. 6 is a graph illustrating a change in an oxidization rate of defective $UO_2$ pellets depending on an oxidization temperature.

FIG. 6 is a graph illustrating an oxidization rate depending on an oxidization temperature in a case where a 1 g of defective $UO_2$ pellets are oxidized in the air. Increase in a maximum oxidization rate of the pellets leads to decrease in a surface area of the oxidized powder. Therefore, in this operation, the defective $UO_2$ pellets are oxidized at a temperature of 300 to 370° C. in such a way that a maximum weight increase rate per 1 g of the $UO_2$ pellets is up to 0.06 wt%/min, thereby producing the $U_3O_8$ powder having a surface area of 1 m²/g or more.

Hereinafter, operation and effects of the present invention will be described in more detail by way of examples. However, the examples below are illustrative of the present invention, but do not limit the scope of the present invention.

INVENTIVE EXAMPLE 1

Starting-material $UO_2$ pellets were oxidized at a temperature of 325° C. in the air to produce a $U_3O_8$ powder. The oxidization rate was 0.02 wt%/min per 1g of the $UO_2$ pellets. The $U_3O_8$ powder was added to $UO_2$ powder by 3, 5, and 10 wt% (A,B, and C), respectively, and then mixed in a tumbling mixer for 2 hours.

The mixed powder was molded under a pressure of 3 ton/cm² to produce a green compact. The compact was heated to 1730° C. at a rate of 300° C. per hour in a wet hydrogen atmosphere (dew-point temperature 7 to 12° C.) and sintered for 4 hours to produce $UO_2$ pellets.

Starting-material $UO_2$ pellets were oxidized at a temperature of 450° C. in the air to produce $U_3O_8$ powder. The oxidization rate was 0.23 wt%/min per 1 g of the $UO_2$ pellets. The $U_3O_8$ powder was added to $UO_2$ powder by 3, 5, and 10 wt%, respectively and then mixed for 2 hours in a tumbling mixer. The mixed powder was molded under a pressure of 3 ton/cm² to produce a green compact. The compact was heated to 1730° C. at a rate of 300° C/hour in a wet hydrogen atmosphere (dew-point temperature 7 to 12° C.) and sintered for 4 hours to produce $UO_2$ pellets.

The densities of pellets produced in Inventive Example 1 and Comparative Example 1, respectively, were measured by Archimedes method. Thereafter, cross-sections of the pellets were specularly polished to observe a pore structure, and also thermally etched to observe a grain structure. The grain size of the pellets was measured by a linear intersection method.

The density and grain size of the pellets measured in this fashion are noted in Table 1 below. Here, samples obtained from Inventive Example 1 and Comparative Example 1 are denoted as Inventive Examples A, B and C and Comparative Examples A, B and C, respectively, according to the weight of the $U_3O_8$ powder added to the $UO_2$ powder (3, 5, and 10 wt %, respectively)

TABLE 1

| Sample No. | Density (g/cm³) | Crystal grain size (μm) |
| --- | --- | --- |
| Inventive Example 1-A | 10.82 | 10.2 |
| Inventive Example 1-B | 10.81 | 10.5 |
| Inventive Example 1-C | 10.77 | 10.1 |
| Comparative Example 1-A | 10.79 | 9.2 |
| Comparative Example 1-B | 10.76 | 9.4 |
| Comparative Example 1-C | 10.67 | 9.1 |

According to Inventive Example 1, the $UO_2$ pellets were obtained by mixing the starting-material $UO_2$ pellets with the $U_3O_8$ powder oxidized at a rate of 0.02 wt%/min/1 g at a temperature of 325° C. When compared with the pellets of Comparative Example 1 produced under the same conditions as Inventive Example 1, except for oxidization conditions of the mixed $U_3O_8$ powder, the pellets of Inventive Example 1 were high in density and modestly bigger in crystal grain size. Also, when it comes to a rate of density reduction caused by increase in the mixing amount of the $U_3O_8$ powder, Inventive Example 1 was found to be lower in a density reduction rate than Comparative Example 1.

Figure 7:
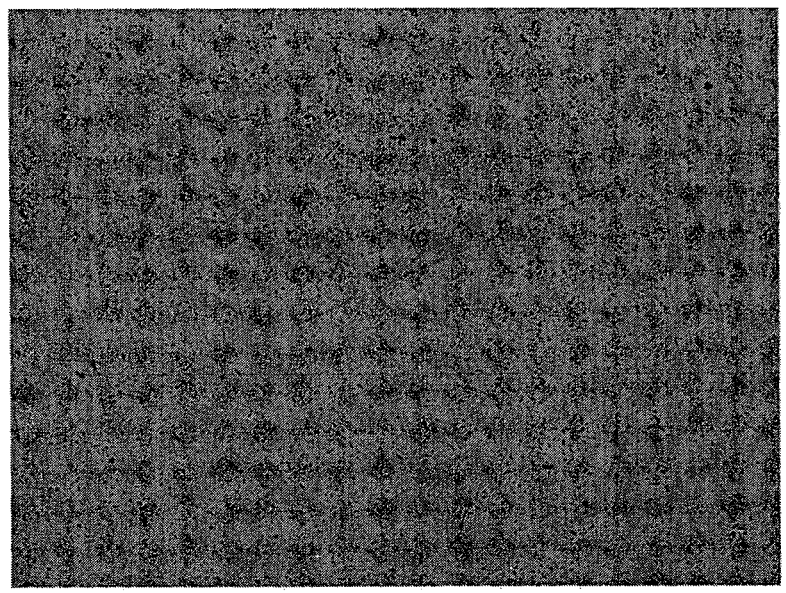
FIG. 7 is an optical microscope (×200) picture illustrating a pore structure of pellets produced according to Example 1(B)
Figure 8:
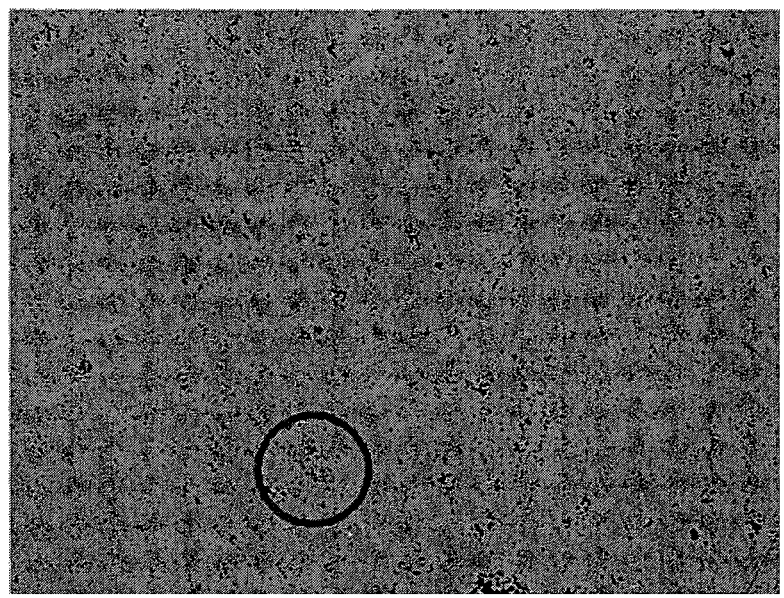
FIG. 8 is an optical microscope (×200) picture illustrating a pore structure of pellets produced according to Comparative Example 1(B)

FIG. 7 is an optical microscope (×200) picture illustrating a pore structure of pellets produced by Inventive Example 1(B), and FIG. 8 is an optical microscope (×200) picture illustrating a pore structure of pellets obtained from Comparative Example 1(B).

FIG. 8 exhibits pores clustered in the shape of grapes (marked with circles). On the other hand, FIG. 7 shows a minute structure with pores very uniformly dispersed without being clustered.

INVENTIVE EXAMPLE 2

Starting-material $UO_2$ pellets were oxidized in the air at a temperature of 325° C. to produce $U_3O_8$ powder. The oxidization was carried out at a rate of 0.02wt%/min. Al2O3 was added to the $U_3O_8$ powder in such a way that Al/U was 800 μ/g and then mixed for 2 hours in a tumbling mixer.

The mixed powder was added by 5wt% again to $UO_2$ powder and then mixed for two hours in the tumbling mixer. The mixed powder contained Al in such a way that Al/U was 40 μg/g. The mixed powder was molded under a pressure of 3 ton/cm² to produce a compact. The compact was heated to 1730° C. at a rate of 300° C/hour in a wet hydrogen atmosphere (dew-point temperature 7 to 12° C.) and sintered for four hours to produce $UO_2$ pellets.

COMPARATIVE EXAMPLE 2

Starting-material $UO_2$ pellets were oxidized in the air at a temperature of 450° C. to produce $U_3O_8$ powder. The oxidization was carried out at a rate of 0.23 wt%/min per 1 g of the $UO_2$ pellets. Al2O3 was added to the $U_3O_8$ powder in such a way that Al/U was 800 μg/g, and then mixed for 2 hours in a tumbling mixer.

The mixed powder was added again to $UO_2$ powder by 5 wt% and then mixed for two hours in the tumbling mixer. The mixed powder contained Al in such a way that Al/U was 40 μg/g. The mixed powder was molded under a pressure of 3 ton/cm² to produce a compact. The compact was heated to 1730° C. at a rate of 300° C./hour in a wet hydrogen atmosphere (dew-point temperature 7 to 12° C.) and sintered for 4 hours to produce $UO_2$ pellets.

The pellets produced according to Inventive Example 2 and Comparative Example 2, respectively, were measured in density by Archimedes method. Thereafter, cross-sections of the pellets were specularly polished to observe a pore structure, and thermally etched to observe a crystal grain structure. The crystal grain size of the pellets was measured by a linear intersection method.

The density and crystal size of the pellets measured in this fashion are noted in Table 2 below.

TABLE 2

| Sample No. | Density (g/cm³) | Crystal grain size (μm) |
| --- | --- | --- |
| Inventive Example 2 | 10.79 | 16.7 |
| Comparative Example 2 | 10.71 | 11.2 |

According to Inventive Example 2, the starting-material $UO_2$ pellets were mixed with the $U_3O_8$ powder oxidized at a rate of 0.02 wt%/min per 1 g at a temperature of 325° C. to obtain the $UO_2$ pellets. The $UO_2$ pellets of Inventive Example 2 were higher in density and bigger in crystal grain size than the pellets of Comparative Example 2 produced under the same conditions except for oxidization conditions of the mixed $U_3O_8$ powder. Notably, the pellets of Inventive Example 2 had a grain size of 16.7 μm, about 50% higher than Comparative Example 2.

Figure 9:
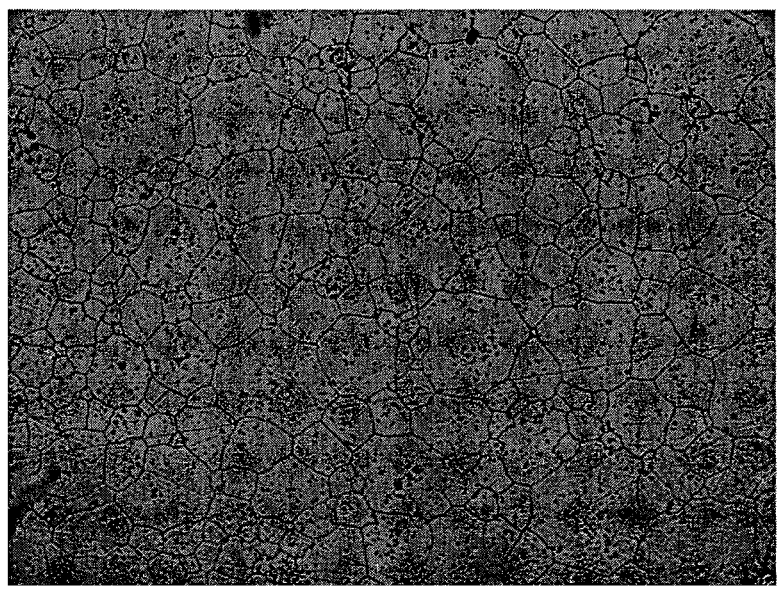
FIG. 9 is an optical microscope (×200) picture illustrating a grain structure of pellets produced according to Example 2.
Figure 10:
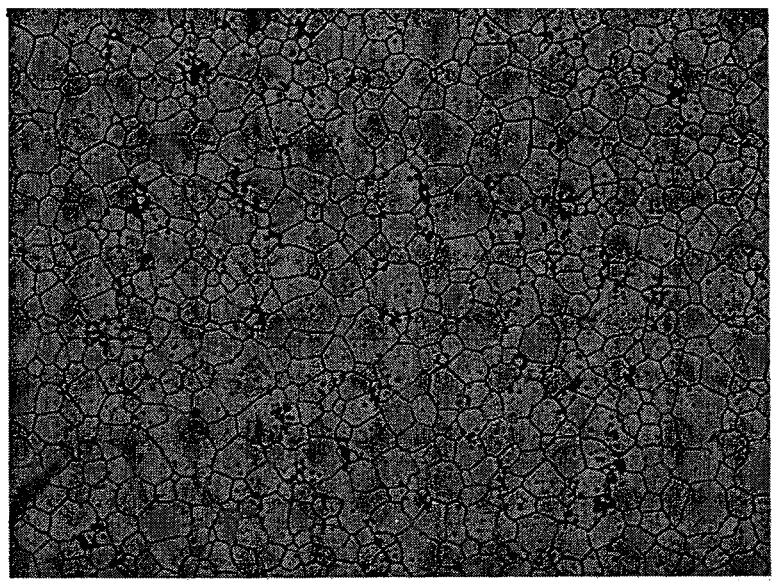
FIG. 10 is an optical microscope (×200) picture illustrating a grain structure of pellets produced according to Comparative Example 2.

FIG. 9 is an optical microscope (×200) picture illustrating a crystal grain structure of the pellets produced according to Inventive Example 2, and FIG. 10 is an optical microscope (×200) picture illustrating a crystal grain structure of the pellets produced according to Comparative Example 2.

FIG. 10 demonstrates the crystal grain structure having pores sized and arranged non-uniformly and FIG. 9 exhibits the minute crystal grain structure having pores uniformly dispersed. Notably, the crystal grains of FIG. 9 are observed to be considerably bigger than the crystal grains of FIG. 10.

As set forth above, according to exemplary embodiments of the invention, in a production method of nuclear fuel pellets, an oxidization temperature and rate of the defective nuclear fuel pellets are regulated to produce $U_3O_8$ powder having a surface area of 1 $m^2/g$ or more. The $U_3O_8$ powder is mixed with the $UO_2$ powder without an additional process to produce pellets by a general pellet production method. This ensures large grain sized pellets with a stable pore structure and high density.

Moreover, an additive such as Al is mixed with the $U_3O_8$ powder and then mixed with the $UO_2$ powder to produce the pellets by the general pellet production method. This also produces the pellets stable in a pore structure, high in density and increased in a crystal grain size.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of producing nuclear fuel pellets, the method comprising:
    producing an $U_3O_8$ powder having a surface area of more than 1 $m^2/g$ and having dominantly a plate shape by oxidizing $UO_2$ pellets at a temperature of 300 to 370° C. in such a way that a maximum weight increase rate per 1 g of the $UO_2$ pellets is up to 0.06 wt %/min;
    producing a mixed powder by mixing the $U_3O_8$ powder with an $UO_2$ powder so that a quaintly of the $U_3O_8$ powder is 2 to 15% by weight of the $UO_2$ powder;
    producing a compact by compression molding the mixed powder; and
    sintering the compact in a reducing gas atmosphere at a temperature of 1600 to 1800° C.,
    wherein each of the $UO_2$ pellets has a weight of 100 mg or more and a density in a range of 8.8 $g/cm^3$ to 10.96 $g/cm^3$.

2. The method of claim 1, wherein the reducing gas comprises hydrogen.

3. The method of claim 2, wherein the reducing gas comprises at least one selected from a group consisting of carbon dioxide, a water vapor and an insert gas.

4. The method of claim 1, further comprising mixing an additive with the $U_3O_8$ powder, between the producing an $U_3O_8$ powder and the producing a mixed powder.

5. The method of claim 4, wherein the additive comprises one of an organic compound, an inorganic compound and mixtures thereof, the organic and inorganic compounds comprising one selected from a group consisting of Al, Cr, Ti, Fe, Nb and mixtures thereof.

6. The method of claim 5, wherein the additive is an Al-compound, wherein the Al-compound is mixed with the $U_3O_8$ powder in such a way that Al/U in the $UO_2+U_3O_8$ mixed powder is 1 to 50 μg/g.

7. The method of claim 6, wherein the Al-compound comprises at least one selected from Al-oxide, Al-nitride, Al-stearate, Al-chloride, and Al-hydroxide.

8. The method of claim 6, wherein the $U_3O_8$ powder has a surface are of 1.5 $m^2/g$ or more.

* * * * *

UNITED STATES PATENT AND TRADEMARK OFFICE
CERTIFICATE OF CORRECTION

| | | |
|---|---|---|
| PATENT NO. | : 8,449,795 B2 | Page 1 of 1 |
| APPLICATION NO. | : 11/947502 | |
| DATED | : May 28, 2013 | |
| INVENTOR(S) | : Jae Ho Yang et al. | |

It is certified that error appears in the above-identified patent and that said Letters Patent is hereby corrected as shown below:

ON THE TITLE PAGE:

Item (57) In the Abstract, Line 6: Replace "U308", with --$U_3O_8$--.

IN THE SPECIFICATION:

In Column 7, Line 14: Add --COMPARATIVE EXAMPLE 1--.

IN THE CLAIMS:

In Column 10, Line 2, Claim 1

Replace "quaintly", with --quantity--.

In Column 10, Line 3, Claim 1

Replace "$UO_2$powder", with --$UO_2$ powder--.

In Column 10, Line 7, Claim 1

Replace "1800° C.,", with --1800° C,--.

In Column 10, Line 16, Claim 4

Replace "insert", with --inert--.

Signed and Sealed this
Fifth Day of August, 2014

Michelle K. Lee
*Deputy Director of the United States Patent and Trademark Office*